United States Patent [19]

Paschkis

[11] Patent Number: 4,528,849
[45] Date of Patent: Jul. 16, 1985

[54] RECEPTACLE WITH MECHANICAL STOP FOR EXPENDABLE IMMERSION DEVICES

[75] Inventor: Albert E. Paschkis, Gwynedd Valley, Pa.

[73] Assignee: General Signal Corporation, Stamford, Conn.

[21] Appl. No.: 539,234

[22] Filed: Oct. 5, 1983

[51] Int. Cl.³ .................... G01D 11/30; G01K 1/14; H01R 11/00
[52] U.S. Cl. .................... 73/432 R; 73/864.59; 339/255 R; 374/140; 403/166
[58] Field of Search .................... 73/432 B, 864.59; 374/139, 140; 136/234; 403/166; 339/255 R

[56] References Cited

U.S. PATENT DOCUMENTS

| | | | |
|---|---|---|---|
| 2,993,944 | 7/1961 | Silver | 136/234 |
| 3,288,654 | 11/1966 | Perrin | 374/140 |
| 3,530,716 | 9/1970 | Truppe et al. | 374/140 |
| 3,647,559 | 3/1972 | Truppe et al. | 374/140 |

*Primary Examiner*—S. Clement Swisher
*Attorney, Agent, or Firm*—Raymond F. MacKay; Harold Huberfeld

[57] ABSTRACT

A manipulator for expendable immersion devices is provided with a spring loaded distal end to absorb mechanical shock when the immersion device is mounted on the manipulator and the manipulator is provided with a mechanical stop to eliminate the possibility of mechanical damage to the immersion device.

8 Claims, 8 Drawing Figures

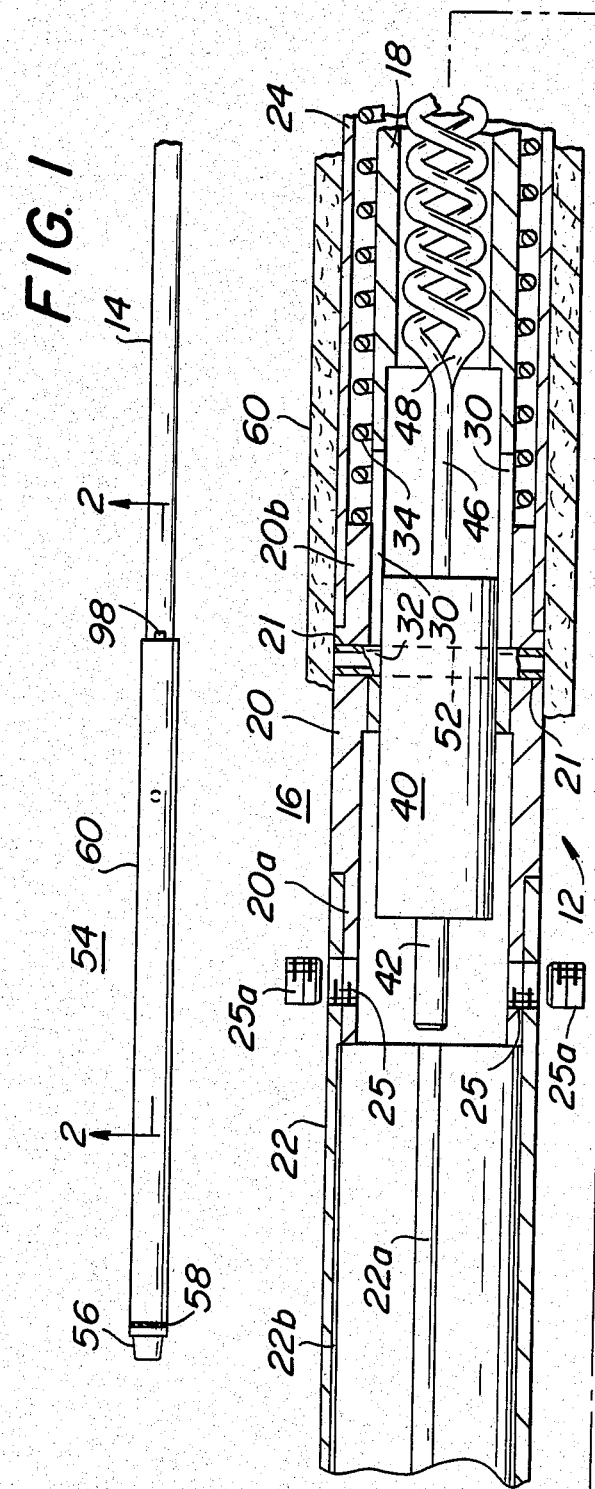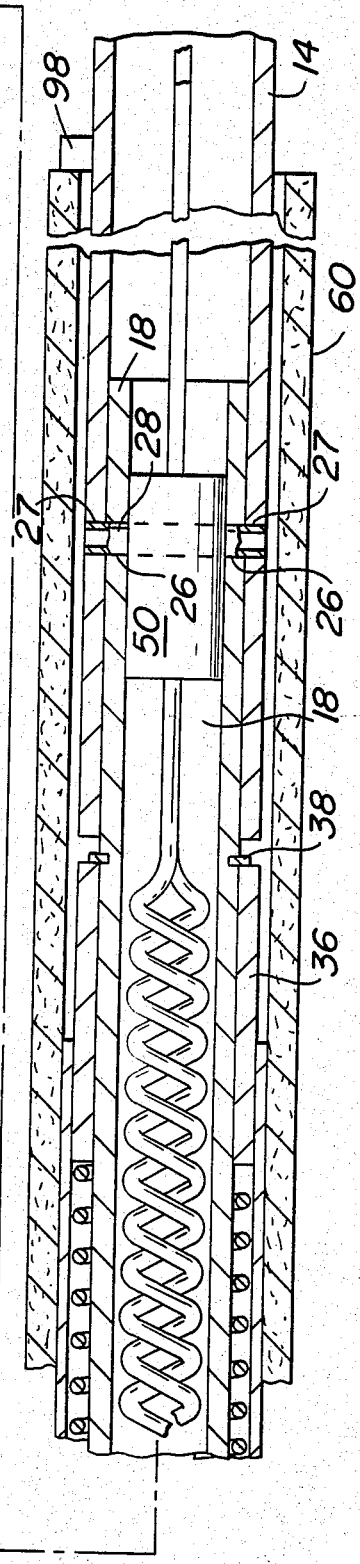

RECEPTACLE WITH MECHANICAL STOP FOR EXPENDABLE IMMERSION DEVICES

This invention relates to manipulators for inserting immersion devices into molten metal and more particularly to an arrangement including a mechanical stop for preventing damage to the immersion device during assembly with the manipulator while insuring proper mounting of the immersion device onto the manipulator in spite of variations in length between the immersion devices due to permissible manufacturing tolerances in the dimensions of the parts constituting the immersion devices and the manipulator.

BACKGROUND OF THE INVENTION

During the refining of molten metal, and particularly of molten steel, the measurement of parameters of the molten metal such as temperature, or oxygen by expendable immersion devices or the taking of molten metal samples by such devices must, due to the temperatures involved, be carried out by operators situated a significant distance from the molten metal. Because of the distance and the temperature, the parameter sensing element is secured, generally by some form of cement into one end of a long hollow heat resistant or insulating tube. In use, a manipulator consisting usually of a metal tube or pipe with a receptacle for the parameter sensing element mounted at one end is inserted into the heat resistant tube until the parameter sensing element engages the receptacle at the end of the manipulator. The manipulator is longer than the heat resistant tube and typically terminates in a handle section to facilitate the immersion into and withdrawal from the molten metal of the parameter sensing element.

Because of the length of the expendable immersion device and of the manipulator it is standard procedure for the operator to grasp the heat resistant tube to mount the expendable immersion device onto the manipulator. Because of the need to adequately and properly engage the parameter sensing element and the receptacle located in the end of the manipulator, the operator at times slides the expendable immersion device onto the manipulator with such force applied to the heat resistant tube that the cement holding the parameter sensing element into the end of the heat resistant tube is cracked or partially broken away. If this condition is not noticed by the operator, molten metal will flow into the interior of the heat resistant tube upon immersion into the molten metal and destroy the receptacle and those parts of the manipulator that are generally protected by the heat resistant tube.

It is an object of this invention to eliminate the possibility of dislodging or partially dislodging the parameter sensing element from the end of the heat resistant tube when an expendable immersion device is mounted on a manipulator.

It is another object of this invention to insure that the parameter sensing element is in proper engagement with the receptacle in the end of the manipulator while avoiding the possibility of dislodging the element when mounting an expendable immersion device on a manipulator.

It is a further object of this invention to provide an improved receptacle for the manipulator to provide easier field replacement of the receptacle in the manipulator.

SUMMARY OF THE INVENTION

In order to prevent an expendable immersion device from being accidentally mounted onto a manipulator with such force that the parameter sensing element or cartridge is partially or completely dislodged from the heat resistant tube in which it is cemented, there is provided on the outer periphery of the manipulator a mechanical stop. The stop is so located along the manipulator that the end of the heat resistant tube of the expendable immersion device engages the stop before the end of the manipulator engages the parameter sensing element or cartridge with sufficient force to crack or break away the cement securing the cartridge in the heat resistant tube.

In order that the receptacle in the end of the manipulator will properly engage the parameter sensing device or cartridge the end portion of the manipulator and the receptacle mounted therein is slidingly mounted with respect to the main body of the manipulator with a spring bias applied between the end portion of the manipulator and the body of the manipulator which produces sufficient force to insure proper engagement between the parameter sensing cartridge and the receptacle without exceeding the force required to break the cement bond between the parameter sensing cartridge and the heat resistant tube when the end of the heat resistant tube is in contact with the mechanical stop on the outer periphery of the manipulator.

BRIEF DESCRIPTION OF THE DRAWINGS

FIG. 1 is a side elevation of an expendable immersion device including the invention;

FIG. 2 is a side elevation, in section, of the end portion of a manipulator and part of the body of the manipulator;

Referring now to FIG. 1 there is shown a manipulator 14 having mounted on its immersion end an expendable immersion device 54 consisting of a parameter sensing element 56 secured as by a cement 58 into the end of a heat resistant tube 60. Secured on the outer periphery of the manipulator 14 is a mechanical stop 98 which in accordance with the invention determines the distance that the expendable immersion device may be slid onto the manipulator 14.

FIG. 2 is a sectional view of a part of FIG. 1 showing that the manipulator 14 includes an end portion 12. The immersion end portion 12 of the manipulator 14 includes a barrel member 16 and a support member 18 telescopically mounted with and providing support for the barrel member 16.

Figure 3:
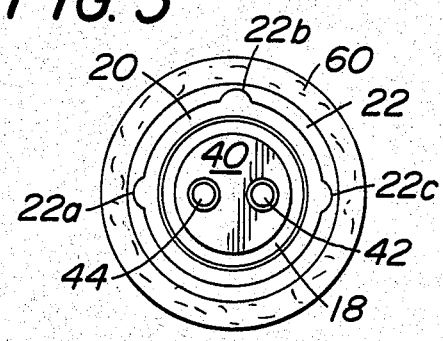
FIG. 3 is an end elevation of the immersion end of the end portion of the manipulator.

In one embodiment of the invention the barrel member 16 was made of a central tubular section 20. As shown, the central tubular section 20 terminates in end portions 20a and 20b having an outside diameter that is less than that of the middle of section 20. Secured to the end portion 20a is a receptacle tube 22 and, to the end portion 20b, a spring cover tube 24. The tubes 22 and 24 preferably both have an outer diameter that is substantially the same as that of the middle of section 20 so that the barrel member 16 has a substantially uniform outer surface throughout its length. While the tubes 22 and 24 may be secured to the section 20 in any of many different ways, in one embodiment this was accomplished by an interference fit between the end portion 20a and the receptacle tube 22, and the end portion 20b and the spring cover tube 24.

As shown in FIG. 2 the support member 18 is a tube having an outside diameter that permits the support member 18 to be telescopically inserted within the central tubular section 20 of the barrel member 16. One end of the support member 18 is provided with diametrically opposite holes 26, 26 which may be used to secure the support member 18 to the manipulator 14 by means of any suitable fastener such, for example, as a roll pin 28 passing through the holes 26, 26 and corresponding holes 27, 27 in the end of the manipulator 14. The distal end of the support member 18 is provided with a pair of diametrically located slots 30, 30 entending axially of the support member 18. The barrel member 16 and the support member 18 are held together by a roll pin 32 which passes through a pair of holes 21, 21 in the central tubular section 20 and the slots 30, 30 in the support member 18. In order to bias the barrel member 16 and support member 18 into a normal position as shown in FIG. 2 a compression spring 34 is mounted in the space between the outside of the support member 18 and the inside of the spring cover tube 24. One end of the spring 34 abuts against the end portion 20b of the section 20 and the other end of the spring presses against the end of a tubular spacer or collar 36 which is held positioned on the support member 18 by means of a locking ring 38.

Since the majority of expendable immersion devices that will be immersed in molten metal by the manipulator 14 will include electrical signal producing parameter sensing devices there has been included in the manipulator 10 shown in FIG. 2 provisions for making electrical connections through the manipulator 14 to measuring devices (not shown) that will respond to the magnitude of the electrical signals to produce a display calibrated in terms of the parameter that is being sensed.

As shown in FIGS. 2 and 3 an electrical plug 40 has a body member positioned within the end of the support member 18 with a pair of electrical connectors 42 and 44 extending from the distal end of the plug 40. Extending from the opposite end of the body member of plug 40 is a pair of color coded lead wires 46 and 48 which may be coiled as they pass through the support member 18. The wires 46 and 48 are secured in the end of the support member 18 by a retainer 50.

The body of the electrical plug 40 is held in fixed position relative to the barrel member 16 by the roll pin 32 which passes through a hole 52 in the body of the plug 40. The retainer 50 is secured in the end of the support member 18 by the roll pin 28 which passes through a hole in the retainer 50.

Figure 4:
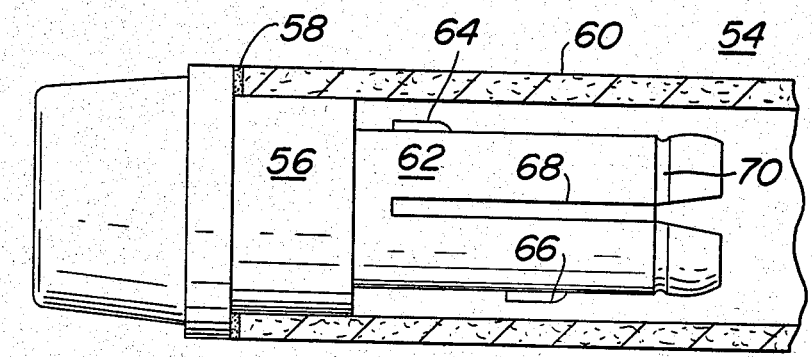
FIG. 4 is a side elevation of a typical expendable immersion device.

FIG. 4 generally represents an expendable immersion device 54 having a parameter sensing element 56 cemented as by a suitable cement 58 into one end of a heat resistant tube 60. The parameter sensing element 56 typically ends in a tailpiece 62 and includes electrical contacts 64 and 66. In order to provide a good electrical connection between the contacts 64 and 66 and their mating contacts the tailpiece 62 is generally made of a resilient material such as plastic or cardboard. In order to provide further resiliency the tailpiece 62 which is usually a hollow cylindrical member also may include a slit 68 in one or both sides of the cylindrical wall. As explained in the discussion with respect to FIGS. 5a-5d a groove 70 is provided in the end portion of the tailpiece 62 to furnish a detent action to keep the expendable immersion device 54 firmly attached to the manipulator 14.

While the plug 40 could be made in the form of a receptacle to accomodate the electrical contacts 64, 66 of the parameter sensing device 56, it has been found in practise that it is desirable to have a receptacle that is easily field replaceable. FIGS. 5a-5d shows a receptacle 72 suited for installation in the immersion end of barrel member 16 to provide for electrical connections between contacts 64, 66 (FIG. 4) and contacts 42, 44 (FIG. 3) and a mechanical holding action for the parameter sensing element 56.

The receptacle 72 is preferably molded of a thermoplastic in two halves 72a, 72b. Because the electrical signal from the parameter sensing device 56 must be connected with proper polarity to the electrical lead wires 46 and 48, the outer surface of the receptacle 72 is provided with three keying protrusions 74a, 74b and 74c. These keying protrusions 74a–74c must be aligned with corresponding grooves 23a, 23b and 23c formed in the inner surface of the receptacle tube 22 in order for the receptacle 72 to be inserted into the tube 22.

The immersion end of the receptacle 72 is in the form of an open ended cylinder. A pair of cylindrical contacts 76, 78 are mounted on the inner wall of the receptacle 72 and axially positioned such that the contacts 64, 66 (FIG. 3) of the parameter sensing device 56 mate with the contacts 76, 78 respectively when the tailpiece 62 is fully inserted into the receptacle 72. A ridge 80 is provided in the inner wall of the receptacle 72 to form with groove 70 in the tailpiece 62 a detent arrangement to firmly hold the tailpiece 62 within the receptacle 72.

Figure 5A:
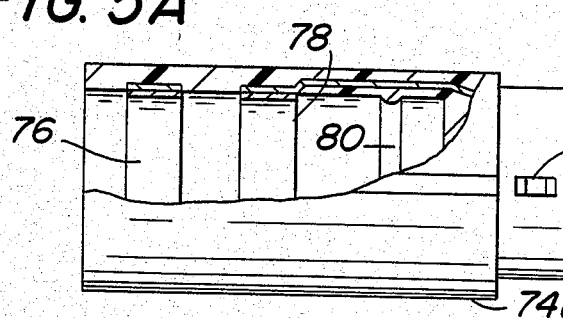
FIGS. 5A-5D are views of a receptacle for mounting in the end portion of the manipulator to receive an expendable immersion device.
Figure 5C:
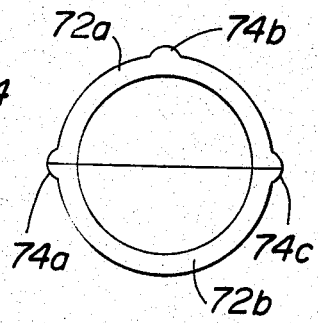
Figure 5B:
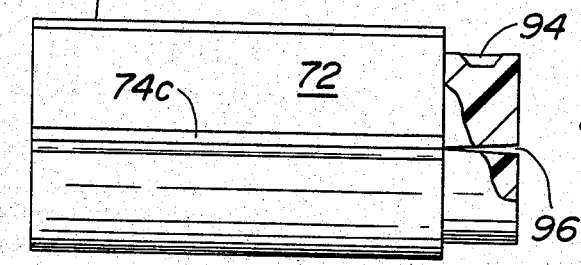
Figure 5D:
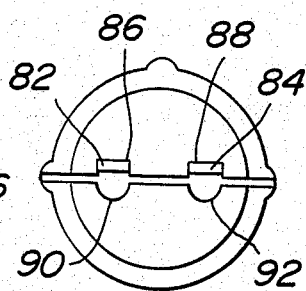

The contacts 76 and 78 are electrically connected to electrical contacts 82 and 84 respectively. As shown in FIG. 5c the contacts 82 and 84 are in the form of a flat conductor carried in axially extending grooves 86 and 88 formed in the receptacle half 72a. Grooves 90 and 92 formed in the receptacle half 72b opposite grooves 86 and 88 respectively receive the contacts 42 and 44 of the electrical plug 40 when the receptacle 72 is fully inserted into the receptacle tube 22.

Each half 72a and 72b of the receptacle 72 is provided with a depression 94 which when the receptacle 72 is fully inserted into the receptacle tube 22 are in alignment with threaded holes 25, 25 in the receptacle tube 22. The final step of field replacement of a receptacle 72 is to tighten set screws 25a, 25b into depressions 94, 94. It will be noted that the halves 72a and 72b of the receptacle 72 are shaped to leave between them a space 96 in the vicinity of the contacts 82, 84. The tightening of the set screws 25a, 25a serves not only to hold the receptacle 72 physically in place within the manipulator but also closes the space 96 to squeeze the flat sides of contacts 82, 84 against the mating surface of the contacts 42, 44 to provide an excellent low electrical resistance between the respective contacts.

The manipulator 14 as thus far described differs from that of the prior art in that the manipulator 14 includes in the end portion 12 the barrel member 16 supported for telescopic movement with respect to the support member 18 and the compression spring 34 disposed between them to continuously urge the barrel member 16 in a forward direction until the roll pin 32 (FIG. 2) engages the immersion end of the axially extending slots 30, 30 in the support member 18. It is to be understood that when a force is applied to the barrel member 16 which exceeds the force of the spring 34 that the barrel member 16 and the electric plug 40 secured by the roll pin 32 will move until further compression of spring 34 produces a force equal and opposite to the applied force or until the barrel member 16 moves a sufficient distance that the roll pin 32 contacts the inner end of slots 30, 30. In practise the compression spring 34 is designed so that the spring force with the roll pin 32 between the two ends of the slots 30, 30 will equal the force required to seat the ridge 80 of the receptacle 72 into the groove 70 of the parameter sensing element 56 for proper mating of the receptacle 72 and the parameter sensing element 56.

It will be appreciated that when an expendable immersion device 54 is forcibly slid onto the manipulator 14 that the compression of the spring 34 will provide a cushioning or shock absorbing effect while providing sufficient opposing force to insure that the receptacle 72 and the parameter sensing element 56 are properly seated. By eliminating the shock that is normally present when the distal end of the manipulator 14 is of solid construction, the possibility of destroying the seal between the heat resistant tube 60 and the parameter sensing element 56 is greatly reduced.

While the shock absorbing feature provided by the invention significantly reduces the likelihood of damaging the seal produced by the cement 58 between the heat resistant tube 60 and the parameter sensing element 56, the possibility of such damage may be completely eliminated by providing a mechanical stop 98 on the manipulator 14 to engage the proximal end of the heat resistant tube 60. Without the stop 98 it is conceivable that an operator when placing an expendable immersion device 50 onto a manipulator 14 may use sufficient excessive force that the roll pin 32 engages the right hand end of slots 30, 30 and the retainer 50 may then apply to the parameter sensing element 56 sufficient force to damage the bond provided by the cement 58 between the heat resistant tube 60 and the parameter sensing element 56. In order to eliminate the possibility of such damage the manipulator 14 is provided with a mechanical stop 98 that engages the end of the heat resistant tube 60 before the roll pin 32 reaches the end of the slots 30, 30.

The design of the manipulator 14 including the slots 30, 30, the compression spring 34, and the stop 98 is such that with the roll pin 32 floating between the ends of the slots 30, 30, the spring 34 will produce a force sufficient to overcome the detent action to seat the ridge 80 into the groove 70 as well as to overcome the seating force between the contacts 64, 66 and 76, 78 respectively. As previously mentioned the stop 98 is positioned from the immersion end of the manipulator 14 a distance such that the heat resistant tube 60 will contact the stop 98 before the roll pin 32 reaches the proximal end of the slots 30, 30.

While the shock-absorbing or cushioning action has been shown produced by a helical compression spring 34, it is to be understood that any spring means may be used including hydraulic or pneumatic springs. The stop 98 has been shown as a block located on the periphery of the manipulator 14. The stop 98 may be in any suitable form such as a collar around the manipulator 14 or may be a coupling in the manipulator 14 accomodating an increase in the outer diameter of the manipulator 14.

The present invention may be embodied in other specific forms without departing from the spirit or essential attributes thereof and, accordingly, reference should be made to the appended claims, rather than to the foregoing specification as indicating the scope of the invention.

What is claimed is:

1. In a manipulator having in one end thereof a receptacle to receive an expendable immersion device having a sensing cartridge with integral electrical contacts sealingly secured in one end of a continuous length of heat insulating tube of sufficient length to provide thermal insulation for said manipulator the improvement for preventing said cartridge from being dislodged from said tube when said device is mounted on said manipulator comprising:
   stop means on the outer surface of said manipulator for engaging the end of said continuous length of heat insulating tube remote from said sensing cartridge and said electrical contacts for limiting the distance said manipulator may be inserted into said heat insulating tube, and
   means to insure that said receptacle and said sensing cartridge are fully and operatively interconnected notwithstanding the limited distance said manipulator may be inserted into said heat insulating tube.

2. A manipulator for immersing into a bath of molten metal an expendable immersion device having a parameter sensing element bonded in one end of a heat resistant tube comprising:
   a receptacle at the end of said manipulator for mating with said parameter sensing element, and
   means for providing a shock absorbing mounting for said receptacle with respect to said manipulator.

3. Apparatus as claimed in claim 2 in which said shock absorbing mounting means includes
   a barrel member
   means for mounting said receptacle in one end of said barrel member
   a support member carried by said manipulator and telescopically mounted within the other end of said barrel member, and
   force producing means between said barrel member and said support member for resisting the movement of said support member into said barrel member.

4. Apparatus as claimed in claim 3 in which said force producing means comprises a spring means between said barrel member and said support member.

5. Apparatus as claimed in claim 4 further including means for limiting the longitudinal motion between said support member and said barrel member.

6. Apparatus as claimed in claim 5 in which said means for limiting said longitudinal motion comprises
   axially extending slot means in said support member and
   radially extending pin means secured to said barrel member and passing into said slot means.

7. Apparatus as claimed in claim 2 further including electrical plug means and in which the proximal end of said receptacle plugs into said electrical plug means.

8. Apparatus as claimed in claim 7 in which said receptacle is constructed of two mating halves with said halves so shaped at their proximal ends as to provide a small space between them when mated together and means for applying forces to said proximal ends of said halves with said electrical plug and said receptacle connected together to hold said receptacle within said manipulator and to close said small space to improve the electrical connection between said receptacle and said electrical plug.

* * * * *